(12) United States Patent
Chen et al.

(10) Patent No.: US 11,661,661 B2
(45) Date of Patent: May 30, 2023

(54) METHOD FOR SYNTHESIZING BETA-CYANO KETONE COMPOUND

(71) Applicant: Changzhou Institute of Technology, Changzhou (CN)

(72) Inventors: Xiaohui Chen, Changzhou (CN); Xianqiang Kong, Changzhou (CN); Yiyi Chen, Changzhou (CN)

(73) Assignee: Changzhou Institute of Technology, Changzhou (CN)

( * ) Notice: Subject to any disclaimer, the term of this patent is extended or adjusted under 35 U.S.C. 154(b) by 0 days.

(21) Appl. No.: 17/931,005

(22) Filed: Sep. 9, 2022

(65) Prior Publication Data
US 2023/0098262 A1   Mar. 30, 2023

(30) Foreign Application Priority Data
Sep. 27, 2021 (CN) .......................... 202111137570.1

(51) Int. Cl.
| | | |
|---|---|---|
| *C25B 3/07* | (2021.01) | |
| *C25B 3/09* | (2021.01) | |
| *B01D 15/08* | (2006.01) | |
| *C25B 3/11* | (2021.01) | |
| *C25B 11/043* | (2021.01) | |
| *C25B 15/08* | (2006.01) | |

(52) U.S. Cl.
CPC ................ *C25B 3/07* (2021.01); *B01D 15/08* (2013.01); *C25B 3/09* (2021.01); *C25B 3/11* (2021.01); *C25B 11/043* (2021.01); *C25B 15/085* (2021.01)

(58) Field of Classification Search
None
See application file for complete search history.

(56) References Cited

PUBLICATIONS

Jiao et al. ACS Catal. 2019, 9, 5191-5197 (Year: 2019).*
Zhao et al. Org. Lett. 2022, 24, 4421-4426 (Year: 2022).*

* cited by examiner

*Primary Examiner* — Wojciech Haske
(74) *Attorney, Agent, or Firm* — Berkeley Law & Technology Group, LLP

(57) ABSTRACT

Disclosed is a method for synthesizing β-cyano ketone compound, including steps of (1) adding a α-keto acid and sodium hydroxide to a separator-free electrolytic cell, adding acetonitrile thereto, and dissolving the α-keto acid and sodium hydroxide in acetonitrile by stirring to be uniform, to obtain a dissolution solution; (2) adding an alkene or a derivative thereof, cyanobenziodoxolone, and an electrolyte to the dissolution solution, to obtain a mixed solution; (3) subjecting the mixed solution to an electrochemical reaction by electrifying a cathode of a platinum sheet, and an anode of a graphite electrode to obtain a reacted solution; and (4) after the electrochemical reaction, collecting the reacted solution, adding water thereto and stirring to obtain a mixture, subjecting the mixture to an extraction to obtain an organic phase, drying the organic phase and purifying, to obtain the β-cyano ketone compound.

8 Claims, No Drawings

METHOD FOR SYNTHESIZING BETA-CYANO KETONE COMPOUND

CROSS REFERENCE TO RELATED APPLICATION

This patent application claims the benefit and priority of Chinese Patent Application No. 202111137570.1, filed on Sep. 27, 2021, the disclosure of which is incorporated by reference herein in its entirety as part of the present application.

TECHNICAL FIELD

The present disclosure relates to the technical field of chemical synthesis, in particular to a method for synthesizing β-cyano ketone compound.

BACKGROUND ART

β-cyano ketone compounds have a structure as shown in formula (III), in which $R^1$ and $R^2$ represent different functional groups, respectively, such as aryl or alkyl. In the field of organic synthesis, β-cyano ketone compounds are very common compounds containing cyano and carbonyl groups, which are widely used in biologically active natural products, medicines, functional materials and other fields. In addition, cyano group is a very important and common functional group. By chemical reactions, cyano group could be transformed into various functional groups such as carboxyl group, amide group, aldehyde group, carbonyl group, and amino group through a series of transformations, thereby realizing the preparation of different compounds.

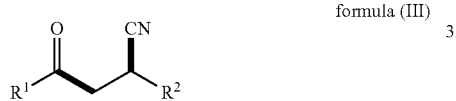

formula (III)

At present, β-cyano ketone compound is mainly prepared by subjecting an α,β-unsaturated ketone to a conjugation cyanation addition reaction, but cyanogen sources currently used are highly toxic cyanation reagents, such as hydrogen cyanide acid, trimethylsilyl cyanide (TMSCN), and potassium cyanide. Alkenes are simple and readily available raw materials, and complex molecules could be rapidly built by the bifunctionalization of alkenes, which has a wide range of applications in organic synthesis. Recently, the group of Prof. Hongli BAO reported the acyl-cyanation reaction of alkenes (Y. Jiao, M.-F. Chiou, Y. Li and H. Bao, "Copper-Catalyzed Radical Acyl-Cyanation of Alkenes with Mechanistic Studies on the tert-Butoxy Radical" [J]. *ACS Catal.*, 2019, 9,5191). However, this method for preparing β-cyano ketone compounds has disadvantages of using more toxic trimethylsilyl cyanide, instability of the raw material aldehyde, using of metals and oxidants, few applicable substrates, long reaction time, and high cost. Therefore, it is of great significance to develop a method for synthesizing a β-cyano ketone compound with mild reaction conditions, simple synthesis steps, and low cost.

CuCl (2.5 mol%)
2,2'-bipyridine (3.5 mol%)
t-BuOOH (2.5 equiv)
MeO$^t$Bu, 12 h, 50° C.

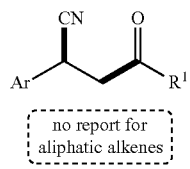

no report for aliphatic alkenes

SUMMARY

In view of the shortcomings above in the existing methods for preparing a β-cyano ketone compound, the present disclosure is intended to provide a method for synthesizing a β-cyano ketone compound from nontoxic raw materials, with mild reaction conditions, simple synthesis steps, and low cost.

To achieve the object, the present disclosure provides the following technical solutions.

Provided is a method for synthesizing a β-cyano ketone compound, comprising using an α-keto acid, an alkene or a derivative thereof, and cyanobenziodoxolone (CBX) as raw materials, and acetonitrile as a solvent, and performing an electrochemical reaction, to obtain the β-cyano ketone compound, wherein the α-keto acid has a general structure formula represented by formula (I), and the alkene or the derivative thereof has a general structure formula represented by formula (II),

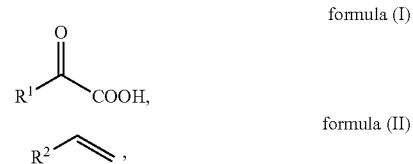

formula (I)

formula (II)

in formula (I), $R^1$ represents an aromatic group or an aliphatic group, and in formula (II), $R^2$ represents an alkyl group, an aliphatic group, an aromatic group or a derived group thereof.

In some embodiments, the method comprises step (1), adding the α-keto acid and an alkali to a separator-free electrolytic cell, adding acetonitrile thereto, and dissolving the α-keto acid and the alkali in acetonitrile by stirring, to obtain a dissolution solution;

step (2), adding the alkene or the derivative thereof, cyanobenziodoxolone, and an electrolyte to the dissolution solution, and stirring to be uniform, to obtain a mixed solution;

step (3), subjecting the mixed solution to an electrochemical reaction by electrifying a cathode of a platinum sheet, and an anode of a graphite electrode, to obtain a reacted solution; and step (4), after the electrochemical reaction, collecting the reacted solution, adding water thereto and stirring to obtain an aqueous solution, subjecting the aqueous solution to an extraction to obtain an organic phase, drying the organic phase and purifying, to obtain the β-cyano ketone compound.

In some embodiments, the method is carried out according to a reaction as shown in formula (IV)

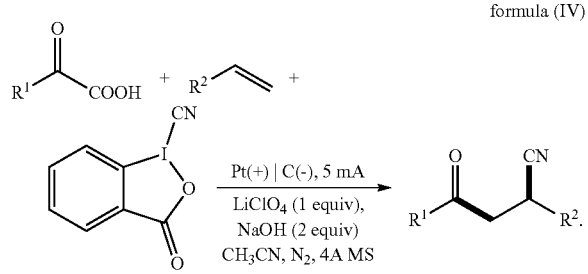

formula (IV)

In some embodiments, by the method according to the present disclosure, β-cyano ketone compounds as follows could be synthesized.
i. 2-(4-bromophenyl)-4-oxo-4-(p-tolyl)butanenitril;
ii. methyl-4-(1-cyano-3-oxo-3-phenylpropyl)benzoate;
iii. 4-oxo-4-phenyl-2-(m-tolyl)butanenitrile;
iv. 2-(2-bromophenyl)-4-oxo-4-phenylbutanenitrile;
v. 2-(2-oxo-2-phenylethyl)hexanenitrile;
vi. 2-(2-oxo-2-phenylethyl)heptanenitrile; and
vii. 4-cyclopropyl-4-oxo-2-phenylbutanenitrile.

In some embodiments, the alkali in step (1) is sodium hydroxide.

In some embodiments, in step (1), a molar ratio of the α-keto acid to sodium hydroxide is in a range of 0.75:1 to 1:1, and a ratio of the molar amount of the α-keto acid to the volume of acetonitrile is in a range of (0.1-0.15) mol: 1 L.

In some embodiments, a ratio of the molar amount of the alkene or the derivative thereof in step (2) to the volume of acetonitrile is in a range of (0.05-0.1) mol: 1 L, and the electrolyte is lithium perchlorate. In some embodiments, a molar ratio of the cyanobenziodoxolone to lithium perchlorate is 1:1.

In some embodiments, a molar ratio of the alkene or the derivative thereof to lithium perchlorate is 1:1.

In some embodiments, step (3) is performed as follows: subjecting the mixed solution to the electrochemical reaction for 6-10 h by electrifying a cathode of a platinum sheet, and an anode of a graphite electrode at a current of 5-10 mA.

In some embodiments, step (4) is performed as follows: after the electrochemical reaction, collecting the reacted solution, adding water thereto and stirring to obtain an aqueous solution, subjecting the aqueous solution to the extraction with ethyl acetate to obtain an organic phase; drying the organic phase with anhydrous sodium sulfate to obtain a dried organic phase, and purifying the dried organic phase by a column chromatography, to obtain the β-cyano ketone compound.

The present disclosure provides a method for directly preparing β-cyano ketone compound by performing an electrochemical reaction using an α-keto acid, an alkene or a derivative thereof, and cyanobenziodoxolone as raw materials, and acetonitrile as a solvent. The method according to the present disclosure is simple in synthesis steps, and solves the problems existed in conventional synthesis methods, such as, using highly toxic cyano reagents, few applicable substrates, and the need of oxidants and technical catalysts. The method for synthesizing a β-cyano ketone compound according to the present disclosure could be carried out at ambient temperature, with mild reaction conditions, and good functional group toleration. The method for synthesizing the β-cyano ketone compound according to the present disclosure involves an electrochemical synthesis, which has low requirements for instruments and equipment due to the fact that the electrochemical reaction could be performed by electrifying alone without any complex photochemical reaction equipment. In addition, in the method, the electric energy needed is directly consumed in the reaction process without energy conversion, thereby reducing the reaction cost to a certain extent.

Beneficial effects of the present disclosure:

(1) In the method for preparing a β-cyano ketone compound according to the present disclosure, the β-cyano ketone compound is prepared by an electrochemical reaction using an α-keto acid, an alkene or a derivative thereof, and cyanobenziodoxolone as raw materials, and acetonitrile as a solvent. The method according to the present disclosure has advantages of high product yield, low toxicity of raw materials used, mild reaction conditions, simple synthesis steps and low cost.

(2) In the method for preparing a β-cyano ketone compound according to the present disclosure, a non-separated electrolytic cell is used in the reaction process. Compared with the conventional method for synthesizing a β-cyano ketone compound, the method according to the present disclosure has advantages of no high requirements on the instruments and equipment, mild reaction conditions, less synthesis steps, short reaction time, simple operation steps, energy saving, and low cost, and thus could be applied in scientific research, medical treatment, industry and other fields.

DETAILED DESCRIPTION OF THE EMBODIMENTS

The technical solutions of the present disclosure will be clearly and completely described below in conjunction with specific examples. Obviously, the described examples are only a part of the embodiments of the present disclosure, rather than all the embodiments. The following description of at least one exemplary examples is merely illustrative in nature and is in no way intended to limit the present disclosure, and application or use thereof. Based on the examples of the present disclosure, all other examples obtained by those of ordinary skill in the art without creative labor shall fall within the scope of the present disclosure.

Example 1

A method for preparing a β-cyano ketone compound was performed as follows.

(1) 0.45 mmol of 4-methylbenzoylformic acid and 0.6 mmol of sodium hydroxide were added into a 10 mL separator-free electrolytic cell, 4 mL of acetonitrile was then added thereto, and 4-methylbenzoylformic acid and sodium hydroxide were dissolved in acetonitrile by stirring for 10 minutes, obtaining a dissolution solution.

(2) 0.3 mmol of 4-bromostyrene, 0.3 mmol of cyanobenziodoxolone, and 0.3 mmol of lithium perchlorate were added to the dissolution solution, and stirred to be uniform, obtaining a mixed solution.

(3) The mixed solution was subjected to an electrochemical reaction for 8 hours by electrifying a cathode of a platinum sheet (10×10×0.1 mm), and an anode of a graphite rod (I=0.6 mm) at a constant current of 5 mA, obtaining a reacted solution.

(4) After the electrochemical reaction, the reacted solution was collected and added into a separatory funnel. 20 mL of water was added thereto and stirred, obtaining an aqueous solution. The aqueous solution was then subjected to an extraction with ethyl acetate, obtaining an organic phase. The organic phase was dried with anhydrous sodium sulfate, obtaining a dried organic phase. The dried organic phase was purified by a column chromatography, obtaining 74.5 mg of a β-cyano ketone compound (i.e. 2-(4-bromophenyl)-4-oxo-4-(p-tolyl)butanenitrile) with a calculated product yield of 76%. The obtained product was confirmed to have a structural formula presented by formula (A).

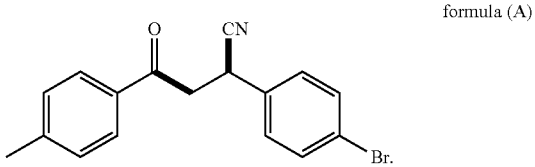

formula (A)

The nuclear magnetic resonance (NMR) data of the obtained product is as follows:
$^1$H NMR (400 MHz, Chloroform-d) δ 7.99 (d, J=8.0 Hz, 1H), 7.88-7.75 (m, 2H), 7.54-7.44 (m, 2H), 7.31 (d, J=2.1 Hz, 2H), 7.24 (d, J=3.9 Hz, 1H), 4.52 (t, J=6.9 Hz, 1H), 3.66 (dd, J=17.9, 7.5 Hz, 1H), 3.46 (dd, J=17.9, 6.4 Hz, 1H), 2.39 (s, 3H).
$^{13}$C NMR (101 MHz, CDCl$_3$) δ 193.99, 145.07, 134.46, 132.37, 130.26, 129.57, 129.32, 128.25, 122.44, 120.33, 44.05, 31.44, 21.74.

In this example and examples below, the product yield was calculated according to the equation below:
Yield=the actual amount of the target product/the theoretical amount of the target product ×100%

Example 2

A method for preparing a β-cyano ketone compound was performed as follows.

(1) 0.45 mmol of benzoylformic acid and 0.6 mmol of sodium hydroxide were added into a 10 mL separator-free electrolytic cell, 4 mL of acetonitrile was then added thereto, and benzoylformic acid and sodium hydroxide were dissolved in acetonitrile by stirring for 10 minutes, obtaining a dissolution solution.

(2) 0.3 mmol of methyl 4-vinylbenzoate, 0.3 mmol of cyanobenziodoxolone, and 0.3 mmol of lithium perchlorate were added to the dissolution solution, and stirred to be uniform, obtaining a mixed solution.

(3) The mixed solution was subjected to an electrochemical reaction for 8 hours by electrifying a cathode of a platinum sheet (10×10×0.1 mm), and an anode of a graphite rod (I=0.6 mm) at a constant current of 5 mA, obtaining a reacted solution.

(4) After the electrochemical reaction, the reacted solution was collected and added into a separatory funnel. 20 mL of water was added thereto and stirred, obtaining an aqueous solution. The aqueous solution was then subjected to an extraction with ethyl acetate, obtaining an organic phase. The organic phase was dried with anhydrous sodium sulfate, obtaining a dried organic phase. The dried organic phase was purified by a column chromatography, obtaining 58.9 mg of a β-cyano ketone compound (i.e. methyl-4-(1-cyano-3-oxo-3-phenylpropyl)benzoate) with a calculated product yield of 67%. The obtained product was confirmed to have a structural formula presented by formula (B),

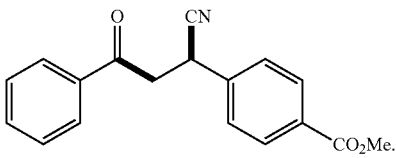

formula (B)

The NMR data of the obtained product is as follows:
$^1$H NMR (400 MHz, Chloroform-d) β 8.09-8.02 (m, 2H), 7.95-7.88 (m, 2H), 7.63-7.57 (m, 1H), 7.52 (d, J=8.2 Hz, 2H), 7.50-7.41 (m, 2H), 4.68-4.55 (m, 1H), 3.92 (d, J=1.1 Hz, 3H), 3.75 (dd, J=18.0, 7.7 Hz, 1H), 3.54 (dd, J=18.0, 6.2 Hz, 1H).
$^{13}$C NMR (101 MHz, CDCl$_3$) δ 194.28, 166.32, 140.15, 135.52, 134.05, 130.51, 130.33, 128.89, 128.12, 127.69, 120.06, 52.30, 44.15, 31.86.

Example 3

A method for preparing a β-cyano ketone compound was performed as follows.

(1) 0.45 mmol of benzoylformic acid and 0.6 mmol of sodium hydroxide were added into a 10 mL separator-free electrolytic cell, 4 mL of acetonitrile was then added thereto, and benzoylformic acid and sodium hydroxide were dissolved in acetonitrile by stirring for 10 minutes, obtaining a dissolution solution.

(2) 0.3 mmol of 3-methylstyrene, 0.3 mmol of cyanobenziodoxolone, and 0.3 mmol of lithium perchlorate were added to the dissolution solution, and stirred to be uniform, obtaining a mixed solution.

(3) The mixed solution was subjected to an electrochemical reaction for 8 hours by electrifying a cathode of a platinum sheet (10×10×0.1 mm), and an anode of a graphite rod (I=0.6 mm) at a constant current of 5 mA, obtaining a reacted solution.

(4) After the electrochemical reaction, the reacted solution was collected and added into a separatory funnel. 20 mL of water was added thereto and stirred, obtaining an aqueous solution. The aqueous solution was then subjected to an extraction with ethyl acetate, obtaining an organic phase. The organic phase was dried with anhydrous sodium sulfate, obtaining a dried organic phase. The dried organic phase was purified by a column chromatography, obtaining 53.8 mg of β-cyano ketone compound (i.e. 4-oxo-4-phenyl-2-(m-tolyl)butanenitrile) with a calculated product yield of 72%. The obtained product was confirmed to have a structural formula presented by formula (C),

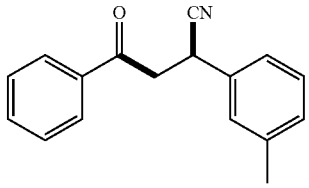

formula (C)

The NMR data of the obtained product is as follows:
$^1$H NMR (400 MHz, Chloroform-d) δ 7.95-7.89 (m, 2H), 7.63-7.54 (m, 1H), 7.46 (dd, J=8.4, 7.1 Hz, 2H), 7.27-7.18 (m, 3H), 7.13 (d, J=7.4 Hz, 1H), 4.51 (dd, J=8.2, 5.8 Hz, 1H), 3.71 (dd, J=18.0, 8.2 Hz, 1H), 3.48 (dd, J=18.0, 5.8 Hz, 1H), 2.36 (s, 3H).
$^{13}$C NMR (101 MHz, CDCl$_3$) δ 194.75, 139.17, 135.75, 135.22, 133.89, 129.17, 129.14, 128.85, 128.16, 128.13, 124.53, 120.78, 44.59, 31.85, 21.40.

Example 4

A method for preparing a δ-cyano ketone compound was performed as follows.

(1) 0.45 mmol of benzoylformic acid and 0.6 mmol of sodium hydroxide were added into a 10 mL separator-free electrolytic cell, 4 mL of acetonitrile was then added thereto, benzoylformic acid and sodium hydroxide were dissolved in acetonitrile by stirring for 10 minutes, obtaining a dissolution solution.

(2) 0.3 mmol of 4-bromostyrene, 0.3 mmol of cyanobenziodoxolone, and 0.3 mmol of lithium perchlorate were added into the dissolution solution, and stirred to be uniform, obtaining a mixed solution.

(3) The mixed solution was subjected to an electrochemical reaction for 10 hours by electrifying a cathode of a platinum sheet (10×10×0.1 mm), and an anode of a graphite rod (I=0.6 mm) at a constant current of 8 mA, obtaining a reacted solution.

(4) After the electrochemical reaction, the reacted solution was collected and added into a separatory funnel. 20 mL of water was added thereto and stirred, obtaining an aqueous solution. The aqueous solution was then subjected to an extraction with ethyl acetate, obtaining an organic phase. The organic phase was dried with anhydrous sodium sulfate, obtaining a dried organic phase. The dried organic phase was purified by a column chromatography, obtaining 57.3 mg of a β-cyano ketone compound (i.e. 2-(2-bromophenyl)-4-oxo-4-phenylbutanenitrile) with a calculated product yield of 61%. The obtained product was confirmed to have a structural formula presented by formula (D),

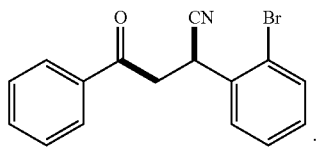

formula (D)

The NMR data of the obtained product is as follows:
$^1$H NMR (400 MHz, Chloroform-d) δ 7.98-7.90 (m, 2H), 7.69 (dd, J=7.8, 1.7 Hz, 1H), 7.59 (td, J=7.2, 6.6, 1.4 Hz, 2H), 7.47 (t, J=7.8 Hz, 2H), 7.39 (td, J=7.6, 1.3 Hz, 1H), 7.22 (td, J=7.7, 1.6 Hz, 1H), 4.91 (dd, J=9.6, 4.2 Hz, 1H), 3.66 (dd, J=18.0, 9.6 Hz, 1H), 3.51 (dd, J=18.0, 4.3 Hz, 1H).
$^{13}$C NMR (101 MHz, CDCl$_3$) δ 194.43, 135.57, 134.40, 133.97, 133.64, 130.14, 129.50, 128.88, 128.47, 128.16, 122.87, 119.82, 42.73, 32.47.

Example 5

A method for preparing a β-cyano ketone compound was performed as follows.

(1) 0.45 mmol of benzoylformic acid and 0.6 mmol of sodium hydroxide were added into a 10 mL separator-free electrolytic cell, 4 mL of acetonitrile was then added thereto, and benzoylformic acid and sodium hydroxide were dissolved in acetonitrile by stirring for 10 minutes, obtaining a dissolution solution.

(2) 0.3 mmol of hexene, 0.3 mmol of cyanobenziodoxolone, and 0.3 mmol of lithium perchlorate were added into the dissolution solution, and stirred to be uniform, obtaining a mixed solution.

(3) The mixed solution was subjected to an electrochemical reaction for 7 hours by electrifying a cathode of a platinum sheet (10×10×0.1 mm), and an anode of a graphite rod (I=0.6 mm) at a constant current of 10 mA, obtaining a reacted solution.

(4) After the electrochemical reaction, the reacted solution was collected and added into a separatory funnel. 20 mL of water was added thereto and stirred, obtaining an aqueous solution. The aqueous solution was then subjected to an extraction with ethyl acetate, obtaining an organic phase. The organic phase was dried with anhydrous sodium sulfate, obtaining a dried organic phase. The dried organic phase was purified by a column chromatography, obtaining 49.7 mg of a β-cyano ketone compound (i.e. 2-(2-oxo-2-phenylethyl) hexanenitrile) with a calculated product yield of 61%. The obtained product was confirmed to have a structural formula presented by formula (E),

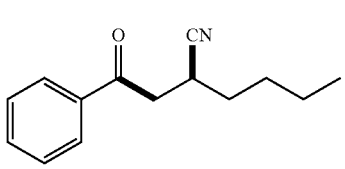

formula (E)

The NMR data of the obtained product is as follows:
$^1$H NMR (400 MHz, Chloroform-d) δ 7.96-7.84 (m, 2H), 7.58-7.49 (m, 1H), 7.42 (dd, J=8.4, 7.1 Hz, 2H), 3.41-3.27 (m, 1H), 3.25-3.11 (m, 2H), 1.64-1.24 (m, 6H), 0.86 (t, J=7.3 Hz, 3H).
$^{13}$C NMR (101 MHz, CDCl$_3$) δ 195.37, 135.95, 133.83, 128.85, 128.05, 121.96, 40.84, 31.71, 29.27, 26.31, 22.15, 13.80.

Example 6

A method for preparing a β-cyano ketone compound was performed as follows.

(1) 0.45 mmol of benzoylformic acid and 0.6 mmol of sodium hydroxide were added into a 10 mL separator-free electrolytic cell, 4 mL of acetonitrile was then added thereto, and benzoylformic acid and sodium hydroxide were dissolved in acetonitrile by stirring for 10 minutes, obtaining a dissolution solution.

(2) 0.3 mmol of 1-octene, 0.3 mmol of cyanobenziodoxolone, and 0.3 mmol of lithium perchlorate were added into the dissolution solution, and stirred to be uniform, obtaining a mixed solution.

(3) The mixed solution was subjected to an electrochemical reaction for 8 hours by electrifying a cathode of a platinum sheet (10×10×0.1 mm), and an anode of a graphite rod (I=0.6 mm) at a constant current of 5 mA, obtaining a reacted solution.

(4) After the electrochemical reaction, the reacted solution was collected and added into a separatory funnel. 20 mL of water was added thereto and stirred, obtaining an aqueous solution. The aqueous solution was then subjected to an extraction with ethyl acetate, obtaining an organic phase. The organic phase was dried with anhydrous sodium sulfate, obtaining a dried organic phase. The dried organic phase was purified by a column chromatography, obtaining 55.6 mg of a β-cyano ketone compound (i.e. 2-(2-oxo-2-phenylethyl) heptanenitrile) with a calculated product yield of 81%. The obtained product was confirmed to have a structural formula presented by formula (F),

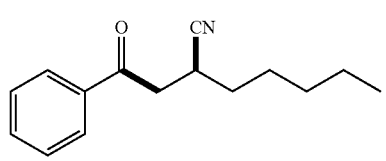

formula (F)

The NMR data of the obtained product is as follows:
$^1$H NMR (400 MHz, Chloroform-d) δ 7.91-7.85 (m, 2H), 7.57-7.51 (m, 1H), 7.42 (t, J=7.7 Hz, 2H), 3.38-3.27 (m, 1H), 3.25-3.12 (m, 2H), 1.63-1.43 (m, 4H), 1.31-1.21 (m, 4H), 0.88-0.79 (m, 3H).

$^{13}$C NMR (101 MHz, CDCl$_3$) δ 195.38, 135.95, 133.82, 128.85, 128.05, 121.96, 40.84, 31.97, 31.16, 26.86, 26.34, 22.39, 13.95.

Example 7

A method for preparing a β-cyano ketone compound was performed as follows.

(1) 0.45 mmol of cyclopropaneacetic acid and 0.6 mmol of sodium hydroxide were added into a 10 mL separator-free electrolytic cell, 4 mL of acetonitrile was then added thereto, cyclopropaneacetic acid and sodium hydroxide were dissolved in acetonitrile by stirring for 10 minutes, obtaining a dissolution solution.

(2) 0.3 mmol of styrene, 0.3 mmol of cyanobenziodoxolone, and 0.3 mmol of lithium perchlorate were added into the dissolution solution, and stirred to be uniform, obtaining a mixed solution.

(3) The mixed solution was subjected to an electrochemical reaction for 8 hours by electrifying a cathode of a platinum sheet (10×10×0.1 mm), and an anode of a graphite rod (I=0.6 mm) at a constant current of 5 mA, obtaining a reacted solution.

(4) After the electrochemical reaction, the reacted solution was collected and added into a separatory funnel. 20 mL of water was added thereto and stirred, obtaining an aqueous solution. The aqueous solution was then subjected to an extraction with ethyl acetate, obtaining an organic phase. The organic phase was dried with anhydrous sodium sulfate, obtaining a dried organic phase. The dried organic phase was purified by a column chromatography, obtaining 40.0 mg of a β-cyano ketone compound (i.e. 4-cyclopropyl-4-oxo-2-phenylbutanenitrile) with a calculated product yield of 67%. The obtained product was confirmed to have a structural formula presented by formula (G),

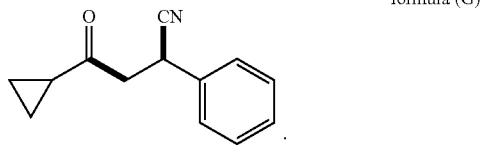

formula (G)

The NMR data of the obtained product is as follows:

$^1$H NMR (400 MHz, Chloroform-d) δ 7.41-7.22 (m, 5H), 4.29 (dd, J=8.0, 6.1 Hz, 1H), 3.24 (dd, J=17.7, 8.0 Hz, 1H), 3.01 (dd, J=17.7, 6.1 Hz, 1H), 1.84-1.78 (m, 1H), 1.08-0.96 (m, 2H), 0.92-0.80 (m, 2H).

$^{13}$C NMR (101 MHz, CDCl$_3$) δ 205.43, 135.20, 129.23, 128.32, 127.38, 120.53, 48.50, 31.71, 29.71, 20.77, 11.54, 11.44.

The above preferred embodiments of the present disclosure are merely to illustrate the present disclosure, and are not intended to limit the present disclosure. Any obvious variations or changes derived from the technical solutions of the present disclosure shall fall within the scope of the present disclosure.

What is claimed is:

1. A method for synthesizing β-cyano ketone compound, comprising
using an α-keto acid, an alkene or a derivative thereof, and cyanobenziodoxolone as raw materials, and acetonitrile as a solvent, and performing an electrochemical reaction, to obtain the β-cyano ketone compound, wherein the α-keto acid has a general structure formula represented by formula (I), and the alkene or the derivative thereof has a general structure formula represented by formula (II)

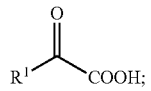

formula (I)

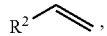

formula (II)

in formula (I), R$^1$ represents an aromatic group or an aliphatic group; and in formula (II), R$^2$ represents an alkyl group, an aliphatic group, an aromatic group or a derived group thereof.

2. The method of claim 1, wherein the method comprises step (1), adding the α-keto acid and an alkali to a separator-free electrolytic cell, adding acetonitrile thereto, and dissolving the α-keto acid and the alkali in acetonitrile by stirring to be uniform, to obtain a dissolution solution;

step (2), adding the alkene or the derivative thereof, cyanobenziodoxolone, and an electrolyte to the dissolution solution, to obtain a mixed solution;

step (3), subjecting the mixed solution to an electrochemical reaction by electrifying a cathode of a platinum sheet, and an anode of a graphite electrode, to obtain a reacted solution; and step (4), after the electrochemical reaction, collecting the reacted solution, adding water thereto and stirring to obtain an aqueous solution, subjecting the aqueous solution to an extraction to obtain an organic phase, drying the organic phase and purifying, to obtain the β-cyano ketone compound.

3. The method of claim 2, wherein the alkali in step (1) is sodium hydroxide.

4. The method of claim 3, wherein in step (1), a molar ratio of the α-keto acid to sodium hydroxide is in a range of 0.75:1 to 1:1, and a ratio of the molar amount of the α-keto acid to the volume of acetonitrile is in a range of (0.1-0.15) mol: 1 L.

5. The method of claim 2, wherein a ratio of the molar amount of the alkene or the derivative thereof in step (2) to the volume of acetonitrile is in a range of (0.05-0.1) mol: 1 L, and the electrolyte is lithium perchlorate.

6. The method of claim 5, wherein a molar ratio of the alkene or the derivative thereof to lithium perchlorate is 1:1.

7. The method of claim 2, wherein step (3) is performed as follows: subjecting the mixed solution to the electrochemical reaction for 6-10 h by electrifying a cathode of a platinum sheet, and an anode of a graphite electrode at a current of 5-10 mA.

8. The method of claim 2, wherein step (4) is performed as follows: after the electrochemical reaction, collecting the reacted solution, adding water thereto and stirring to obtain an aqueous solution, and subjecting the aqueous solution to an extraction with ethyl acetate to obtain an organic phase; drying the organic phase with anhydrous sodium sulfate to obtain a dried organic phase; and purifying the dried organic phase by a column chromatography, to obtain the β-cyano ketone compound.

* * * * *